Feb. 6, 1968

R. C. LANGLEY 3,367,696

METAL TO CERAMIC SEAL

Filed June 22, 1965

INVENTOR.
Robert C. Langley
BY
*Samuel Kahn*
ATTORNEY

United States Patent Office 3,367,696
Patented Feb. 6, 1968

3,367,696
METAL TO CERAMIC SEAL
Robert C. Langley, Millington, N.J., assignor to Engelhard Industries, Inc., Newark, N.J., a corporation of Delaware
Filed June 22, 1965, Ser. No. 465,908
6 Claims. (Cl. 287—189.365)

ABSTRACT OF THE DISCLOSURE

A novel seal between a ceramic body and a metal flange, wherein the flange is fitted into a recess between two ceramic elements and the recess is filled with a fused glass sealant to bond the ceramic bodies and metal flange in gas tight relationship.

---

The present invention relates to improvements in the process for making metal-to-ceramic seals.

Attempts to seal a metal to a ceramic article have encountered several major problems. In conventional methods, efforts have been directed to forming seals wherein the metal must be wetted by a sealant. Such a sealant, normally a metal alloy, when melted, must wet the ceramic surface and the metal so as to adhere to them when solidified. Another requirement of a sealtant is to provide a seal that will not fail under thermally induced expansion-contraction strains and stresses. The choice of metal alloys and ceramics with compatible expansion rates is very limited. Further conventional techniques for forming such seals involve many steps, often in controlled atmospheres, and often requiring complex and expensive equipment such as vacuum furnaces. The formation of metal ceramic seals which will withstand high temperatures, e.g. above about 600° C., is an even greater problem, and in addition to using multiple steps under controlled conditions, heretofore has required the use of expensive precious metal brazing alloys.

In accordance with the present invention, a ceramic to metal seal is provided wherein a thin metal alloy flange is encased within a ceramic body, and locked into place by ceramic-to-ceramic seals formed with a glass-containing sealant. The metal alloy flange is perforated to provide ceramic-to-ceramic reinforcing sites or locking means. Further, the ceramic body initially consists of two elements, one of which is recessed to receive the thin metal flange, and the ceramic elements are adapted to be fused together to encase or sandwich the metal flange. By the method of this invention, no attempt is made to seal a metal to ceramic along a single plane, and it is not critical to have the metal wetted by the sealant. Instead, a three-dimensional unit is formed which has greater overall strength as compared to a single plane seal. Further, the ceramic-to-metal seal can be prepared by a one step process and does not require the use of expensive brazing alloys or special equipment. The seal can be formed in air, although for high temperature use, it is preferable to form the seal in a controlled atmosphere, e.g. a nitrogen rich atmosphere.

Figure 1:
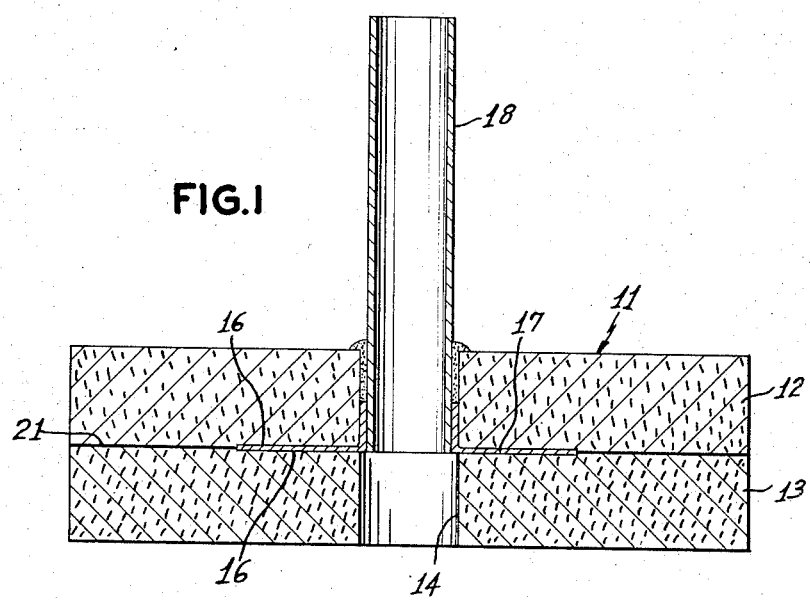

To illustrate the practice of the present invention, reference is made to accompanying FIGURE 1, which shows in cross-section a metal tube 18 sealed to a ceramic member 11 by the method of the present invention. The ceramic member 11 comprises a ceramic disc formed of two matching ceramic elements 12 and 13, and having a central bore 14. Each of the ceramic elements is shaped with a recess 16, within which the metal flange 17 is fitted. It will be understood that only one ceramic element need be so recessed, and such recess should be proportioned to receive the thickness of the metal flange. Metal tube 18 is attached to metal flange 17 by brazing, welding or the like, preferably before the ceramic to metal seal is made.

Figure 2:
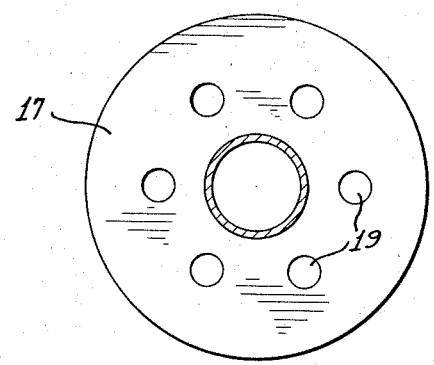

Referring to FIGURE 2, which is a vertical section of the flange 17, it will be seen that the face plate of the flange is provided with holes 19.

The ceramic to metal seal of the present invention is prepared as follows:

A thin film of a suspension of finely-divided glass-containing powder, preferably in aqueous suspension, is applied to the surfaces of the ceramic elements 12 and 13 where they are to be joined, as indicated by line 21, in FIGURE 1, and to the metal alloy flange within recess 16. Sufficient glass powder is employed to fill recess 16. The assembly thus formed, comprising the ceramic elements, the thin metal flange and the finely-divided glass powder is then fired in air or a nitrogen rich atmosphere at or above the fusion temperature of the glass powder. The firing temperature and time depend upon the particular glass powder employed. For example, using Pemco Frit P–1701, strong metal-to-ceramic assemblies have been obtained after firing gradually to 1000° C. with a 30-minute soak at peak temperatures. followed by slow cooling to room temperature. Preferably the metal tube 18 may be attached to flange 17 prior to assembly and firing of the assembly.

It will be appreciated that in the ceramic-to-metal seal formed as described above, ceramic-to-ceramic seals are formed by fusion of the glass sealant through the holes 19 in the flange 17. Thus, ceramic-to-ceramic reinforcing sites are provided which lock the metal flange into place within the sandwich structure. To provide a stronger bond, it has been found desirable to roughen the surfaces of the metal flange.

In the practice of the present invention, any of the conventional ceramics may be used. Examples of suitable ceramics are refractory oxides such as alumina, silica, beryllia or zirconia, and porcelains such as nepheline syenite or feldspar porcelains. Vitreous or partially vitreous as well as crystalline material may be used. Generally, ceramics which are employed for high temperature applications should have low thermal coefficients of expansion. The ceramic may be porous or essentially non-porous.

The glass powder which is employed in the practice of the invention should have a high melting temperature, e.g. above 850° C. where the assembly is to be employed at elevated temperature, and a suitable coefficient of thermal expansion close to that of the ceramic element. Suitable glasses include Pemco Frit P–1701, Ferro Frit No. 3293, and Corning Glass No. 7056. It will be appreciated that the materials of construction must be selected to suit the particular application of the seal. For example, when used in a reducing atmosphere, the ceramic and glass powder should be free of reducible components. Exemplary of some glass powders with low thermal coefficients of expansion and free of reducible components that have been found suitable are those having the nominal compositions set forth in the following table.

TABLE

| Ingredients as Oxides | Parts by Weight of— | | |
|---|---|---|---|
| | Glass "A" (1) | Glass "B" (2) | Glass "C" (3) |
| $Al_2O_3$ | 13.6 | 5.5 | 15.7 |
| $SiO_2$ | 44.9 | 70.6 | 51.3 |
| $B_2O_3$ | 35.4 | 45.1 | 29.0 |
| $K_2O$ | 3.5 | 19.3 | 7.5 |
| $Na_2O$ | 2.7 | 1.4 | 4.0 |
| $CaO$ | 9.5 | 0.4 | 36.4 |
| $SrO$ | 17.7 | 0.7 | 43.8 |
| Total | 127.3 | 143.0 | 187.7 |

The metal alloy flange should have suitable refractory properties, and also should have a coefficient of expansion to match that of the glass powder. Alloys having an expansion coefficient close to that of glass within certain temperature ranges are known. For example, nickel-cobalt-iron alloys such as "Kovar," "Therlo" and "Fernico" containing nominally 23–30% Ni, 16–30% Co, <1% Mn, and the balance Fe. Nickel-iron alloys containing balanced amounts of silicon, tungsten or carbon may be used. The metal flange should have a thickness from about 5 to 30 mils, preferably about 20 mils.

While the foregoing description has been directed to the use of a glass powder as the sealant, it may, in certain cases, be desirable to admix with the glass powder a finely-divided ceramic of the same composition as the ceramic element employed in the assembly. For example, the sealant may comprise a mixture of glass and ceramic powder containing from 10 to 75% ceramic powder. The addition of ceramic powder to the glass frit serves to increase the temperature at which the seal can be used and forms a stronger bond with the ceramic substrate.

Additionally, finely divided metal powders can be added to the powdered glass sealant. For example, finely-divided silver or copper powder or a dilute solution of Ag or Cu compounds in an amount of 1 part to 10,000 of glass frit may be added to provide nucleation sites in the glass after fusion. These sites promote crystal growth when the glass is maintained at an elevated temperature for a period of time. When significant crystallization has occurred, the softening temperature of the crystallized material is raised significantly, e.g., 150 to 300° C., and the upper temperature at which the seal can operate is raised accordingly.

EXAMPLE

Employing the process of the present invention, a metal-to-ceramic seal was made employing a nepheline syenite containing ceramic. The metal flange was fabricated of "Therlo," an alloy comprising 28.5%–29.5% Ni, 16.5%–17.5% Co, 0.5% Mn and the balance Fe. The glass sealant was Pemco P–1701 glass (325 mesh powder) having the nominal composition indicated as Glass "A" in the preceding table.

The surface of the metal flange was roughened by sandblasting, and welded at the shoulder to a stainless steel tube, then coated with an aqueous slurry of the glass frit, dried, and assembled within two recessed and mating ceramic discs. The assembly was fired at 820–880° C. for 60 minutes, then gradually cooled to room temperature.

The resultant seal was tested under 30 p.s.i.g. $N_2$ at temperatures up to 700° C. No leak was detected.

The seals prepared in accordance with the present invention may be used for sealing ceramic vacuum tube envelopes where high temperature outgassing is necessary as well as high operating temperatures, for sealing thermowells into ceramic walls of furnaces, and the like. The seal described herein finds particular utility in the fabrication of apparatus for the separation of hydrogen from a mixture of gases by diffusion through a nonporous hydrogen-permeable membrane supported on a porous ceramic body.

What is claimed is:

1. A seal between a ceramic body and a metal flange, said flange being fitted into a recess between two ceramic elements cemented to one another in face-to-face contact, said flange having an axially directed cylindrical shoulder extending from one side thereof, at least one of said elements having a bore receiving the flange shoulder, said flange having a perforate face plate, said recess and the perforations in said face plate being filled with a sealant comprising fused glass.

2. The seal of claim 1 wherein the coefficient of expansion of the flange and the fused glass are substantially the same.

3. The seal of claim 1 wherein the ceramic elements are cemented to one another with a fused glass frit.

4. The seal of claim 1 wherein only one ceramic element is recessed to receive the flange plate.

5. The seal of claim 1 wherein said sealant comprises a fused admixture of glass powder and ceramic powder.

6. The seal of claim 1 wherein said sealant contains trace amounts of a metallic nucleating agent.

References Cited

UNITED STATES PATENTS

| | | | |
|---|---|---|---|
| 227,118 | 5/1880 | Man | 29—473.1 |
| 1,165,951 | 12/1915 | Dunlap | 29—472.9 |
| 1,554,703 | 9/1925 | Berry | 287—189.365 |
| 2,770,923 | 11/1956 | Dalton et al. | 287—189.365 |
| 2,835,060 | 5/1958 | Staaf | 151—41.7 |

CARL W. TOMLIN, *Primary Examiner.*

R. S. BRITTS, *Assistant Examiner.*